United States Patent [19]
Peterson

[11] Patent Number: 5,908,203
[45] Date of Patent: Jun. 1, 1999

[54] AIR BAG COVER

[75] Inventor: Francis Peterson, Prescott, Wis.

[73] Assignee: Phillips Plastics Corporation, Phillips, Wis.

[21] Appl. No.: 08/878,083

[22] Filed: Jun. 18, 1997

[51] Int. Cl.$^6$ ................................................. B60R 21/20
[52] U.S. Cl. .................. 280/728.3; 280/731; 200/61.54; 200/511
[58] Field of Search ................... 280/728.3, 731, 280/732; 200/61.54, 511

[56] References Cited

U.S. PATENT DOCUMENTS

| | | | |
|---|---|---|---|
| 3,728,509 | 4/1973 | Shimojo | 200/511 |
| 5,023,418 | 6/1991 | Beckhausen | 200/511 |
| 5,172,931 | 12/1992 | Baba et al. | 280/728.3 |
| 5,265,904 | 11/1993 | Shelton et al. | 280/731 |
| 5,288,103 | 2/1994 | Parker et al. | 280/728.3 |
| 5,590,902 | 1/1997 | Eckhout | 280/728.3 |
| 5,698,283 | 12/1997 | Yamasaki et al. | 280/728.3 |
| 5,741,025 | 4/1998 | Meyer et al. | 280/731 |

Primary Examiner—Peter C. English
Attorney, Agent, or Firm—Merchant, Gould, Smith, Edell, Welter & Schmidt, P.A.

[57] ABSTRACT

An air bag cover includes a thermoplastic front cover adapted to enclose an uninflated air bag, a tear seam defined in the rear inner surface of the air bag cover for permitting the deployment of the air bag, and a filler bead comprising a second thermoplastic material that forms a bond with the tear seam, wherein the bond breaks upon deployment of the air bag.

3 Claims, 2 Drawing Sheets

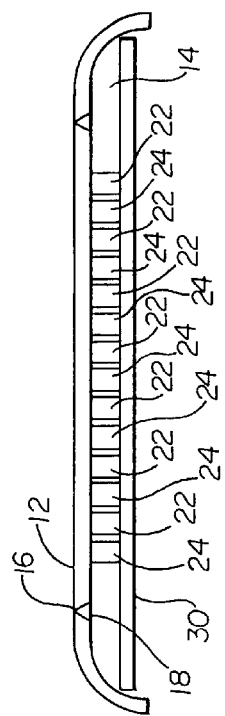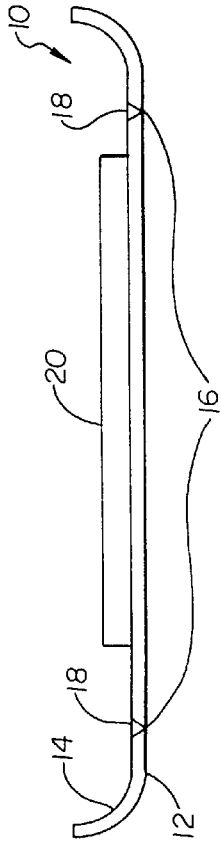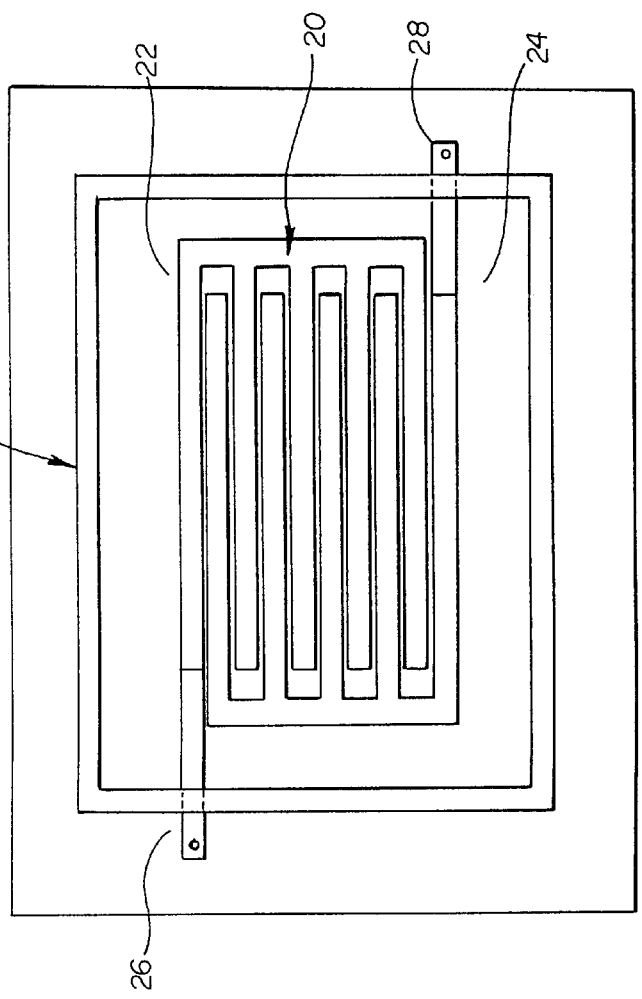

AIR BAG COVER

FIELD OF THE INVENTION

The present invention relates to air bag covers.

BACKGROUND OF THE INVENTION

Automobile air bags are stored behind an air bag cover in the steering column or in the passenger side of the dash board. In order for the air bag to deploy upon the impact of the automobile, the air bag cover has tear seams that tear and release the inflating air bag. These tear seams are visible on the face of the air bag cover often interfering with the aesthetics of the interior of the automobile. Attempts at hiding the tear seams, such as that disclosed in U.S. Pat. No. 5,498,026 to Eckhout, result in the sagging of the air bag cover along the tear seams, thus not effectively hiding the tear seams from view.

For the convenience and safety of the automobile driver, it is desirable to place the horn switch under the surface of the air bag cover. However, any switching mechanism placed between the air bag and the driver becomes a projectile upon deployment of the airbag.

SUMMARY OF THE INVENTION

One aspect of the present invention is directed to an air bag cover. The air bag cover includes a thermoplastic front cover adapted to enclose an uninflated air bag, a tear seam defined in the rear inner surface of the air bag cover for permitting the deployment of the air bag, and a filler bead comprising a second thermoplastic material that forms a bond with the tear seam, wherein the bond breaks upon deployment of the air bag.

Another aspect of the present invention is directed to an air bag cover including a conductive elastomer horn switch arranged behind the rear inner surface comprising a first conductive elastomer element interleaved with a second conductive elastomer element, whereby depressing the front outer surface of the air bag cover causes the first conductive element to contact the second conductive element.

Yet another aspect of the present invention is directed to a method for manufacturing the above-described air bag cover. According to one embodiment, the method provides the manufacture of an air bag cover including the steps of injecting a first thermoplastic material into a mold which defines an air bag cover adapted to enclose an uninflated air bag, the cover having a tear seam defined in the rear inner surface for permitting the deployment of the air bag, and injecting a second thermoplastic material into the tear seam, wherein the second thermoplastic material forms a bond with the first thermoplastic material that breaks upon deployment of the air bag.

The above summary of the present invention is not intended to describe each disclosed embodiment, or every implementation, of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings, in which:

FIGS. 2a and 2c are cross sectional views of an air bag cover in accordance with the present invention; and FIG. 2b illustrates a rear view of an air bag cover with the backing removed.

Figure 1:
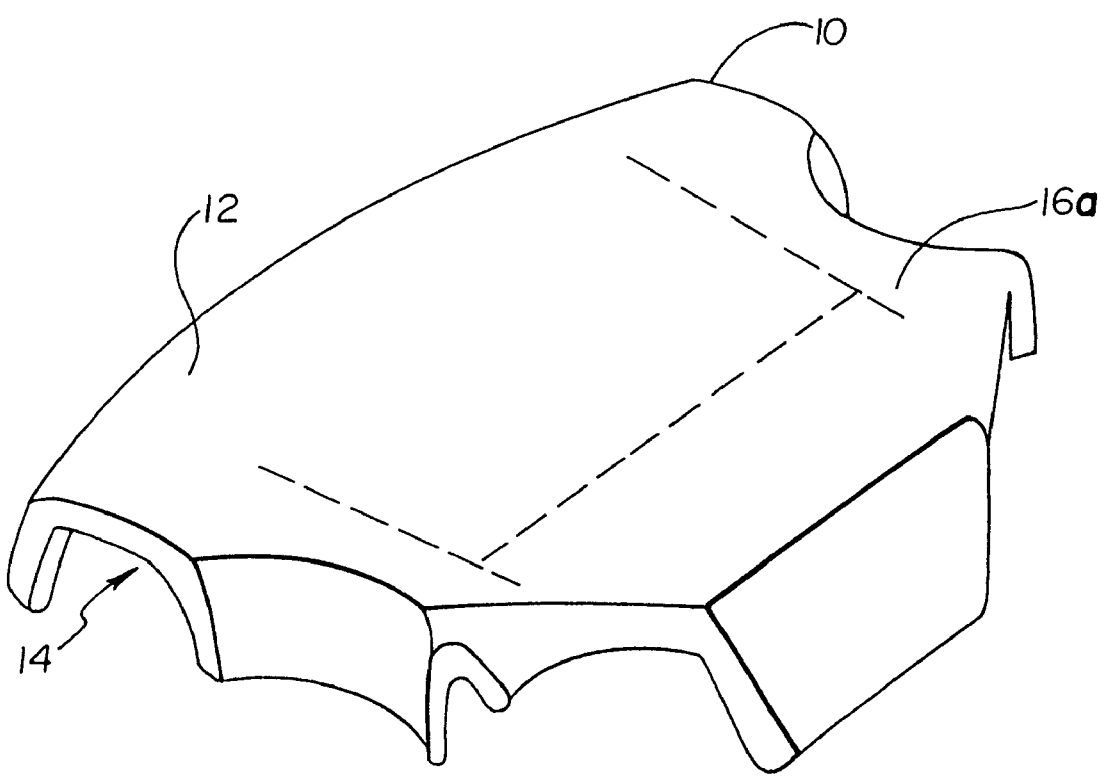
FIG. 1 is a perspective view of an air bag cover, according to one embodiment of the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

One important aspect of the present invention is directed to the implementation of an air bag cover for an automobile steering wheel, for example, as illustrated in the perspective view of the air bag cover 10 of FIG. 1. The air bag cover 10 includes a front surface 12 and a rear surface 14. The dashed lines indicate the tear seams 16a defined in the rear surface 14 of the air bag cover 10. Upon deployment of the air bag, the air bag cover 10 tears along the tear seams 16a to release the air bag. In accordance with this invention, the tear seams 16a are not visible on the front surface 12 of the air bag cover 10.

FIG. 2a is a cross-section view of the air bag cover 10. The air bag cover 10 is used with an air bag, schematically represented by the box 11. A tear seam 16 is defined within the rear surface 14 of the air bag cover 10. The tear seam 16 may form a V-shape, as illustrated in FIG. 2a, or any other shape such that the front surface 12 of the air bag cover 10 forms a continuous surface. The tear seam 16 is visually imperceptible when viewed from the front surface 12.

In order to prevent the sagging of the front surface 12 along the tear seam 16, the tear seam 16 is filled with a tear bead 18 made up of a different thermoplastic elastomer material than the air bag cover 10. A bond is formed between the rear surface 14 along the tear seam 16 of the air bag cover 10 and the tear bead 18. This bond is strong enough so as to remain fixed to the tear seam 16 so as to prevent sagging, yet weak enough that the air bag cover 10 will tear along the tear seam 16 upon deployment of the air bag. In one embodiment of the present invention, the air bag cover 10 is made from propylene polymer or vinyl and the tear bead 18 is an olefinic thermoplastic elastomer such as SANTOPRENE. It will be understood that any combination of elastomers may be used in order to form the bond between the tear seam 16 and the tear bead 18.

In another embodiment of the present invention, FIG. 2b illustrates a conductive elastomer horn switch 20 affixed to the rear surface 14 of the air bag cover 10. The horn switch 20 comprises a first conductive elastomer element 22 and a second conductive elastomer element 24. Attached to the conductive elastomer elements 22 and 24 are terminals 26 and 28, respectively. By interleaving the conductive elastomer elements 22 and 24 in close proximity to one another, a multitude of contact regions are formed. Upon depression of the front surface 12 of the air bag cover 10, the conductive elastomer elements 22 and 24 contact one another closing the horn switch 20. The terminals 26 and 28 of the horn switch 20 are connected to a conventional automobile horn circuit. It will be understood that the interleaved conductive elements 22 and 24 may be placed in a variety of arrangements besides the finger-like projections illustrated in FIG. 2b.

FIG. 2c illustrates a cross-sectional view of one embodiment of the air bag cover 10 according to the present invention. The conductive elastomer elements 22 and 24 are ribs 0.25" high and 0.25" high, respectively, and spaced 0.040" apart. The ribs may be any conductive elastomer, e.g., a carbon infused olefinic thermoplastic elastomer such as SANTOPRENE. The ribs are held in place by a thermoplastic backing 30. A force exerted on the front surface 12 of the air bag cover 10 causes the front surface 12 and the thermoplastic backing 30 to flex resulting in contact between the conductive elastomer elements 22 and 24.

The air bag cover 10 and horn switch 20 are manufactured using conventional injection molding techniques. However, according to one embodiment of the present invention the air bag cover 10 and horn switch 20 are manufactured using a two step process: first, the air bag cover 10 having the tear seam 16 is injected; and second, the tear bead 18 is injected. In one embodiment, the horn switch 20 and the tear bead 18 comprise the same conductive elastomer so that the air bag cover horn switch assembly can be injected in the two step process.

Among other benefits and advantages, these above-disclosed embodiments permit a relatively inexpensive and straightforward manufacture of an air bag cover 10 and horn switch 20. Since the horn switch 20 is constructed of thermoplastic material, it is less likely to injure the driver of the automobile upon deployment of the air bag.

It will be apparent to those skilled in the art that various modifications and variations can be made to the embodiments illustrated herein without departing from the scope or spirit of the invention. Such modifications and variations do not depart from the true scope and spirit of the invention which is set forth by the following claims.

What is claimed is:

1. An air bag assembly comprising an air bag cover enclosing an air bag, the air bag cover comprising:

a front cover comprising a first thermoplastic material adapted to enclose an uninflated air bag, the cover having a front outer surface and a rear inner surface;

a tear seam defined in the rear inner surface for permitting the deployment of the air bag;

a filler bead comprising a second thermoplastic material that forms a bond with the tear seam, wherein the bond breaks upon deployment of the air bag; and a conductive elastomer horn switch affixed to the rear inner surface comprising a first conductive elastomer element interleaved with a second conductive elastomer element, whereby depressing the front outer surface causes the first conductive element to contact the second conductive element.

2. The air bag assembly of claim 1, the first element and the second element comprising interleaved fingers.

3. An air bag assembly comprising an air bag cover enclosing an air bag, the air bag cover comprising:

a front cover comprising a first thermoplastic material adapted to enclose an uninflated air bag, the cover having a front outer surface and a rear inner surface; and a conductive elastomer horn switch affixed to the rear inner surface comprising a first conductive elastomer element interleaved with a second conductive elastomer element, whereby depressing the front outer surface causes the first element to contact the second element.

* * * * *